United States Patent
Peterson et al.

Patent Number: 5,450,063
Date of Patent: Sep. 12, 1995

[54] BIRD AVERT SYSTEM

[75] Inventors: Rodney R. Peterson, Sandy; Carl Johansson, Midway, both of Utah

[73] Assignee: Peregrine, Inc., Sandy, Utah

[21] Appl. No.: 136,826

[22] Filed: Oct. 18, 1993

[51] Int. Cl.$^6$ ............................................. G08B 23/00
[52] U.S. Cl. ................................... 340/573; 119/713; 340/326; 340/552
[58] Field of Search ..................... 340/573, 384.2, 603, 340/552–554, 326, 331, 332, 309.15; 367/139, 93–94; 348/143, 144, 152–155; 342/27–28; 119/713, 719, 720, 721; 116/22 A; 362/802; 43/1

[56] References Cited

U.S. PATENT DOCUMENTS

| | | | |
|---|---|---|---|
| 3,897,753 | 8/1975 | Lee et al. | 119/51.02 |
| 4,736,907 | 4/1988 | Steffen | 43/1 X |
| 4,769,794 | 9/1988 | Beuter et al. | 367/139 |
| 5,299,971 | 4/1994 | Hart | 446/484 |

FOREIGN PATENT DOCUMENTS

2083992  4/1982  United Kingdom .

Primary Examiner—John K. Peng
Assistant Examiner—Thomas J. Mullen, Jr.
Attorney, Agent, or Firm—M. Reid Russell

[57] ABSTRACT

The invention in a bird avert system is for installation at a polluted pond, in or around a wet lands area, or the like, to discourage or frighten away birds and includes microwave, radar, or other signal generation and receiving arrangements for forming an electronic net a distance above the pond or ground level, that is triggered by passage therethrough of a bird. On sensing a bird presence in the electronic net, operation of alarm devices for frightening away the bird is commanded. The alarm devices are operated both on a sensing of a bird passage through the electronic net and at timed intervals, and the alarm devices can include high intensity and/or strobe lights, that can be colored or filtered appropriately to present primary colors as a bird is sensitive to, speakers for broadcasting sounds such as human voices, screeching, guns firing, and the like, as would frighten a bird, and floating platforms maintained under usual bird flight paths that may include moving human and predator bird replicas. Preferably, the system is controlled by a programmable logic controller that provides for connection of the invention components to electrical power and for collecting data on system operations and even pond and weather conditions thereat, and the like, and may be linked to a remote computer for receiving commands and passing information for statistical compilation.

16 Claims, 6 Drawing Sheets

BIRD AVERT SYSTEM

BACKGROUND OF THE INVENTION

1. Field of the Invention

This invention relates to systems for the protection of migratory birds and in particular to systems for discouraging or scaring away such migratory birds from an area, such as a polluted pond, that could be dangerous to them if they land upon it.

2. Prior Art

With the increased industrialization of our society disposal of waste so as to protect the environment, has become a monumental problem. Such environmental concerns, in addition to air and ground pollution, rightly include protecting the survival of animals and birds. Tragically, it is reported that over the last thirty years some three hundred (300) species of migratory birds alone have become extinct or are dangerously close to extinction. A partial responsibility for the heavy mortality of migratory birds rests with a proliferation of chemically imbalanced or otherwise contaminated man made ponds, such as tailings ponds, that are produced in mining operations, waste ponds, as are utilized in power generation stations, and the like. Migratory birds in flight do not discern or distinguish between good and bad ponds and often choose contaminated water as a refuge from stressful flight. This choice often results in their becoming victims of the contaminated water that they have landed upon. Such ponds are profusely scattered across North America, along the birds north-south migratory flyways. Prior to the invention, there has been little or no effective technology that deals with or even addresses the serious and continuing threat that these polluted ponds present to the lives of thousands of migratory birds. Further, to protect aircraft flight activities proximate to wet lands, for hazing and scaring birds away from aircraft flight paths.

Against a backdrop of increasing environmental concern for preservation of migratory birds and aircraft safety concerns, a number of schemes have been proposed to discourage birds from landing on polluted ponds and in wet lands proximate to airports. None, however up until the present invention, have been viable or effective, and in some situations seem to have caused more bird deaths than landing on the polluted waters would have. Specifically, nets have been stretched over ponds to restrict bird access, that birds landing in low light, as at sunrise or sunset, often cannot see and are caught in the net and die. Further, systems have been employed that, while they are not themselves lethal to birds, such as periodic firing of propane gas cannons, flashing of lights, and broadcasting different sounds, have not been effective as they have been set to operate at time intervals only and, as to airport areas may create more problems with bird activity than they solve. Such systems therefore do not stop birds from landing though they may scare them away after they have landed and become contaminated, and, for bird control at airports, may be offensive to anyone living in the neighborhood. Prior to the invention, there has not existed a system that is arranged to operate on sensing a birds flight path into a targeted area of a polluted pond or wet lands that, upon making that sensing, provides for operation of a number of strategically positioned lights, a modulated sound and moving devices as hazing and alarm devices to scare the approaching bird away prior to touching down. The present system can be programmed to trigger its operation based upon a sensing of a single bird and at selected time periods, and can provide, through a computer linkage, for a gathering of statistical information and for alerting a remote operator to bird activity around a pond or in an area of wet lands, and to pond conditions, or the like.

SUMMARY OF THE INVENTION

It is a principal object of the present invention in a bird avert system to provide a system that includes a capability for detecting an approach of a bird or birds for landing on a polluted pond or into an airport operations area to operate a network of lights, sound generators and moving devices there around to scare off a bird or birds.

Another object of the present invention is to provide a signal generation system for establishing an electronic net to overlay a polluted pond or in a wet lands area adjacent to an airport, spaced above the surface a distance to intercept a landing bird's flight path, triggering alarm devices, to scare away the bird.

Another object of the present invention is to provide an arrangement of radar or microwave transmitter-receivers positioned at intervals around a polluted pond or wet lands area for providing a system of a beam or beams that overlap the pond or wet lands at a minimum height above the pond or wet lands surface.

Another object of the present invention is to provide a number of light generators as alarm devices positioned around and even on the pond or wet lands area for activation to present flashing strobe or continuous lights that may be filtered to present primary colors as birds are sensitive to so as to frighten a bird entering the electronic net.

Still another object of the present invention is to provide a plurality of sound generators positioned around and even on the pond or wet lands area for activation upon sensing a bird entering the electronic net to generate sounds as are appropriate to scare away a bird entering the electronic net.

Still another object of the present invention is to provide a system of visual displays located in and around the pond or wet lands area that are activated by a bird entering the electronic net to present moving devices to haze and scare away a bird entering the electronic net.

Still another object of the present invention is to provide, as visual displays, floating platforms for anchoring on the pond or maintained in the wet lands area that mount mannequins, predatory bird, such as a falcon, models, or the like, that can be motor driven to provide arm waving, wing flapping, and the like, to scare away a bird entering the electronic net.

Still another object of the present invention is to provide a bird avert system for electronic control by a computer system that optionally can provide a communications link to a master computer for providing a remote record of system operations and, as appropriate, can be linked to sensors positioned in the pond or wet lands area and to an adjacent weather station for providing a record of pond or wet lands area and weather conditions.

The invention in a bird avert system includes a radar transmitter-receiver or a number of microwave transmitters and receivers for positioning around a polluted pond or wet lands area to generate an electronic net at a selected minimum height over the pond or wet lands.

A net or grid is provided at a distance above the pond that, when entered by a bird on approach for landing, provides for sensing that bird and triggers alarm systems to operate light, sound and visual displays so as to scare away the bird prior to its touching down. The electronic net operation is controlled by a programmable logic controller that can be set to react to a minimum number or size of bird, or periodically as controller by a timer.

The alarm light displays can be high intensity spot lights, strobe lights, or the like, that can be filtered to display primary other bird sensitive to increase the light effectiveness in discouraging birds from landing. Along with the light displays are arranged audio devices that are placed around and even in the pond or wet lands to broadcast sounds such as human voices, dogs barking, shotgun reports, screeching falcons, and other appropriate sounds as would discourage a bird from landing. Complementing the visual and audio alarms, the invention preferably includes a number of floating or stationary platforms that are strategically anchored on the pond or within the wet lands and mount dummies, such as mannequins and predatory birds, such as falcons, that can be life size or greater than life size, and may provide a capability for movement, such as arm waving and wing flapping.

The programmable logic controller provides both operational and a programmed input(s) to the components of the system and includes a timer to trigger system operation at regular intervals, as needed, and may be set to operate upon sensing a minimum number or size of bird. The controller can be linked by telephone to a remote computer for remote operation control and to provide for monitoring and recording of events and keeping track of pond or wet lands water conditions as through sensors, such as pH, temperature, and the like, and can involve linkage to a weather station in the area for correlation of bird events with weather conditions for development of statistical modeling.

DESCRIPTION OF THE DRAWINGS

The above set out objects and features will become more apparent in light of the drawings and their description set out below.

DETAILED DESCRIPTION

The invention in a bird avert system is for sensing a migratory birds coming in for a landing on a polluted pond that triggers alarm devices for scaring the bird or birds away prior to their touching down. The system therefore provides for both sensing the bird on approach to a landing when it is still off the water a sufficient distance to abort that landing and for activating a number of light, sound and movement producing alarm devices to scare that bird away from landing where the bird avert system is here shown installed around and in a polluted pond. I should be understood that the system could be installed in a wet lands area or pond close to an are such as an airport, where it is desired to limit bird activity, within the scope of this disclosure.

Figure 1:
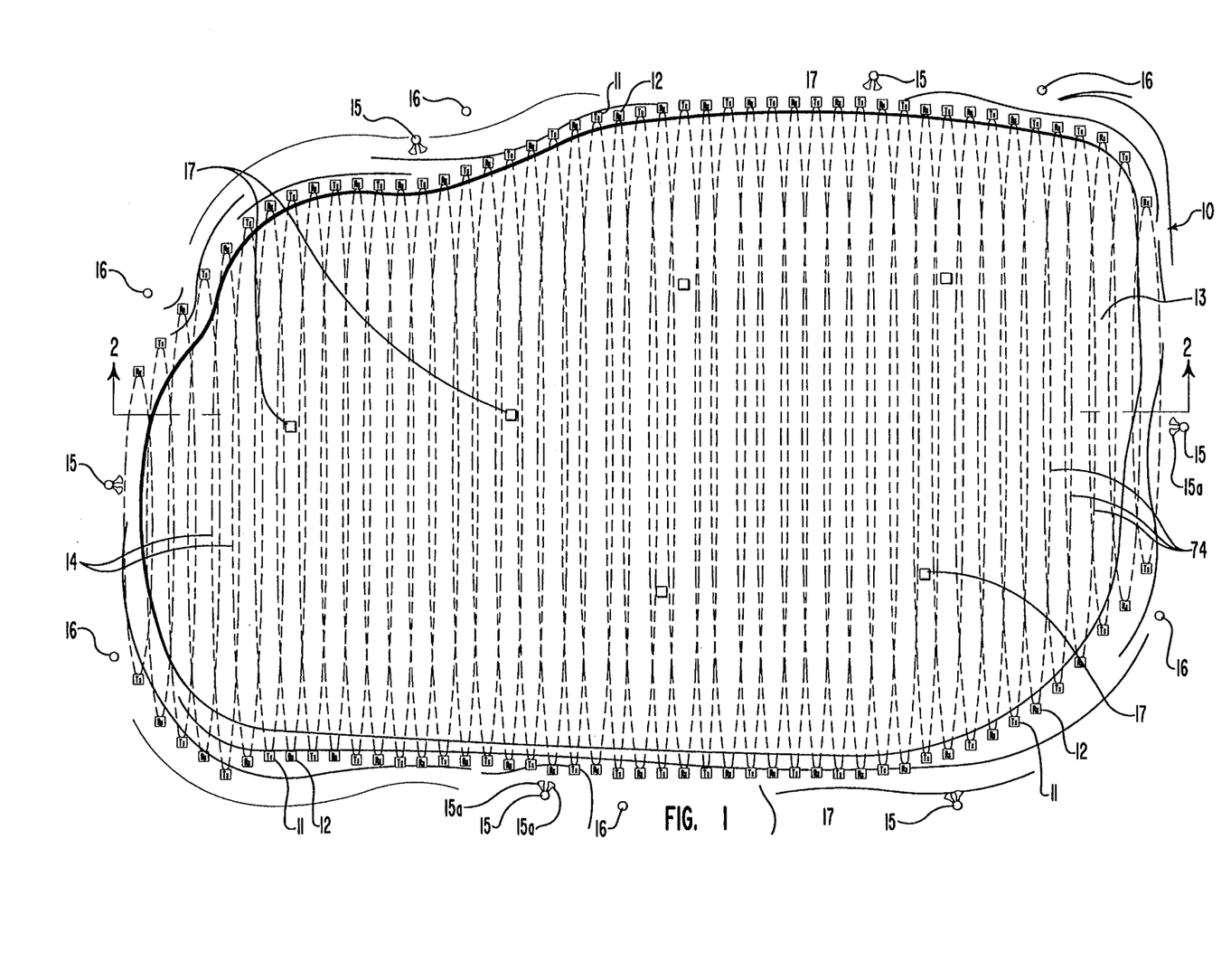
FIG. 1 is a top plan topographical view of a polluted pond showing a number of microwave transmitters and receivers positioned at spaced intervals around the pond, and showing in broken lines, a microwave electronic net over the pond.

FIG. 1 shows a first embodiment of a microwave bird avert system 10, hereinafter referred to as microwave system, that includes separate microwave transmitters 11 and receivers 12 positioned at spaced intervals around a polluted pond 13, hereinafter referred to as pond while a pond 13 is shown herein, it should be understood that the bird avert system 10 of the invention can be maintained in and/or around a wet lands area or the like within the scope of this disclosure. The microwave transmitters and receivers, as shown, are situated back from the pond and, it should be understood, are at a selected distance above the level thereof. Microwaves are, of course, line of sight signals and, accordingly, the transmitters 11 and receivers 12 must be positioned above the pond to provide a microwave net. The net is shown as a system of overlapping broken lines 14, that is at a required height above the pond surface so as to intercept a flight path of a landing bird at a sufficient height to scare the bird away from landing. In practice, the electronic net should be a minimum of two (2) feet above the pond surface and no higher than twenty (20) feet, to appropriately intercept a bird that is set up to land on the pond 13. Additionally, as discussed in detail hereinbelow, the system preferably can be operated both on sensing a bird or birds preparing to land on the pond 13, and can be operated by a timer, or the like.

A bird passing through the electronic net 14 disrupts a signal or signals generated by the transmitter 11 and directed to a receiver 12 for the microwave net of FIG. 1. Whereas, for a radar electronic net B of FIGS. 5 and 5A a signal reflection or return to the radar receiver of the radar 50 indicates a bird sensing. For both microwave and radar systems, the bird sensing is passed to a programmable logic controller 60 of the block flow schematic of FIG. 6, that transmits a signal to operate alarm devices of the system 10. Such alarm devices include speakers 15 shown in FIG. 1, that located at intervals around and even in the pond 13, wet lands, or the like, and lights 16, with speakers 40 and lights 41 maintained on floating platforms 17 that are anchored or maintained in the pond, wet lands or the like.

Figure 1A:
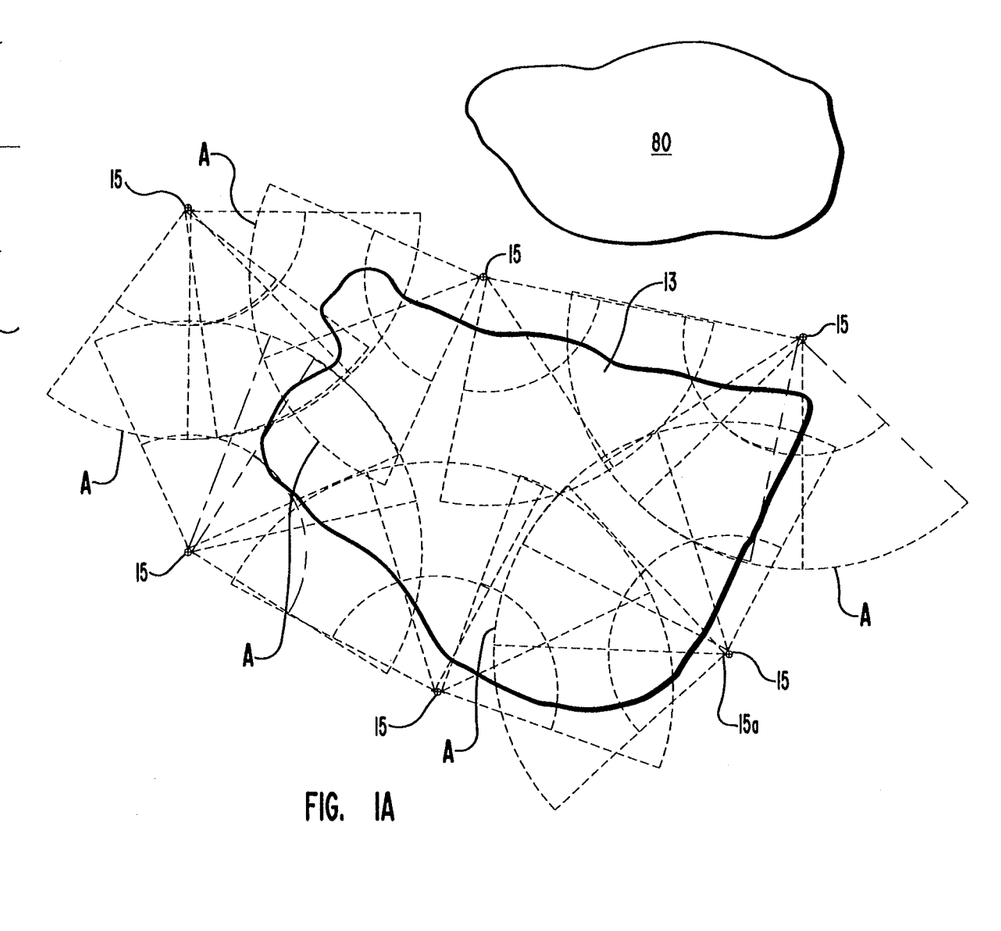
FIG. 1A is a top plan view of the pond of FIG. 1 showing a plurality of speakers mounted on posts or platforms positioned around the pond to project a sound pattern thereover, as shown in broken lines.
Figure 1B:
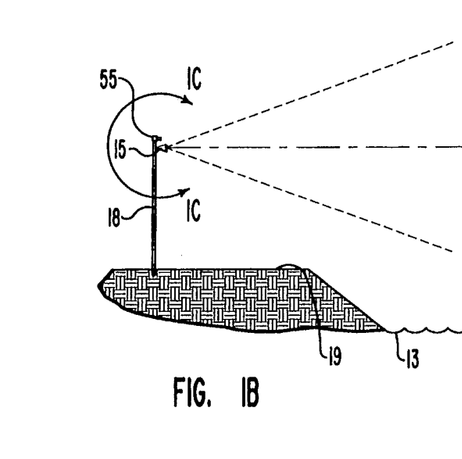
FIG. 1B is a side elevation view of a pole mounted speaker of FIG. 1A.

FIG. 1A shows a top plan view of the pond 13 with the speakers 15 shown maintained at spaced intervals there around, and showing, in broken lines, arcs A of sound that are segments of arc emanating from each of double cones 15a of each of the speakers 15. Each speaker 15 that can be fixed or motor driven, not shown, to pivot back and forth to produce the respective arcs of sound. As shown, the arcs of sound A somewhat overlap each other so as to cover the entire pond surface and extend into the surrounding shoreline. Each of the double cone ends 15a of the speakers 15 are preferably elevated, as shown in FIG. 1B, and broadcast sound therefrom such as sounds of human voices, dogs barking, shotgun reports, screeching and other appropriate bird thwarting sounds. Each speaker 15, as illustrated in FIG. 1B, can be mounted on a top end of pole 18 or platform to provide a strong audio signal directed therefrom at a desired height above the pond 13 surface. Which pole, in practice, is arranged to provide a top end at a height of approximately two (2) to five (5) feet above the pond 13 surface.

Figure 6:
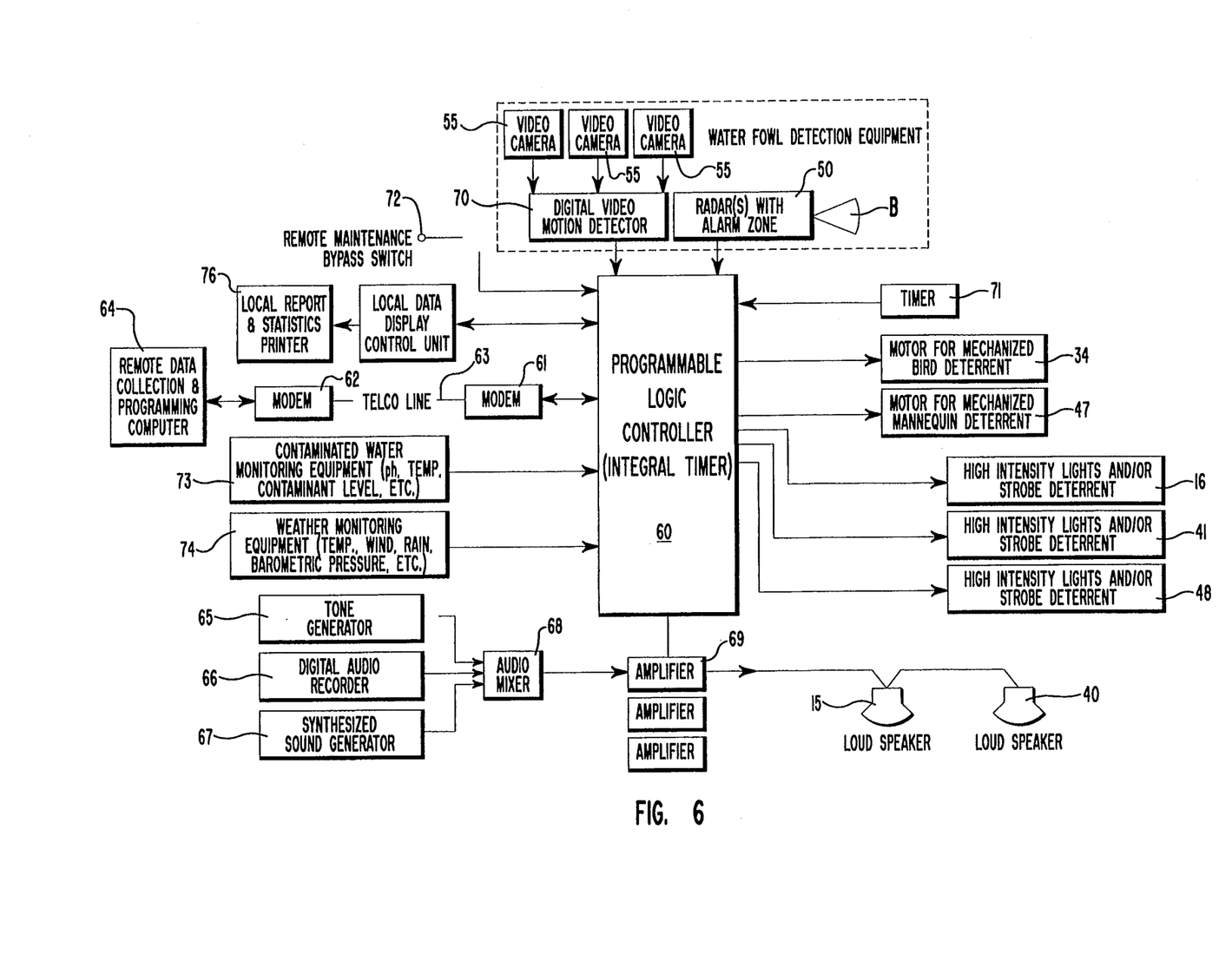
FIG. 6 is a block flow schematic showing a programmed logic controller wired to the components of the system for sensing through the electronic net, a bird presence, and commanding operations of the components, and showing the controller linked to sensors for sensing pond conditions and showing a telephone wire linkage to a remote computer.

Additional to the arrangement of speakers 15, a number of lights 16 are shown in FIG. 1 positioned at spaced intervals around the pond 13 that, it should be understood, are electrically connected so as to be operated by the programmable logic controller 60, shown in FIG. 6, on sensing of a bird passage through the electronic net. The lights are preferably high intensity lights, strobe lights, or the like, and may be filtered to project primary colors as the birds see and are sensitive to. Further, though not shown, the lights may be focused into beams that are pivoted to illuminate the pond surface, within the scope of this disclosure. Speakers 40 and lights 41 are shown in FIGS. 3 and 4 included on floating platforms 17, and are also operated by the programmable logic controller 60, as set out hereinbelow.

Figure 2:
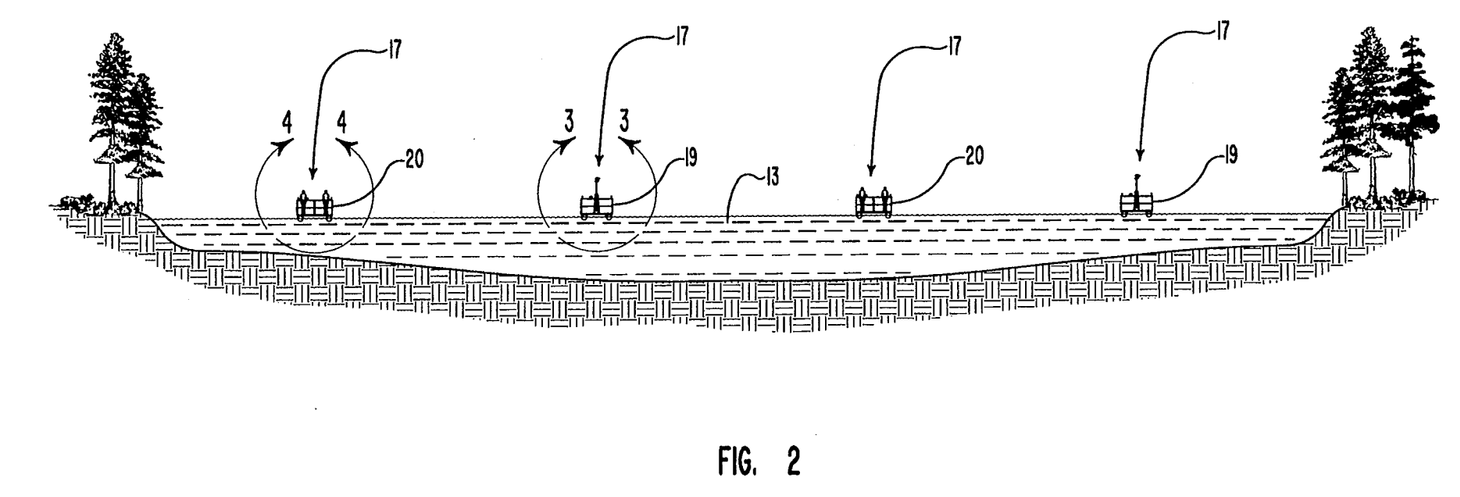
FIG. 2 is a side elevation view taken along the line 2—2 of FIG. 1.
Figure 3:
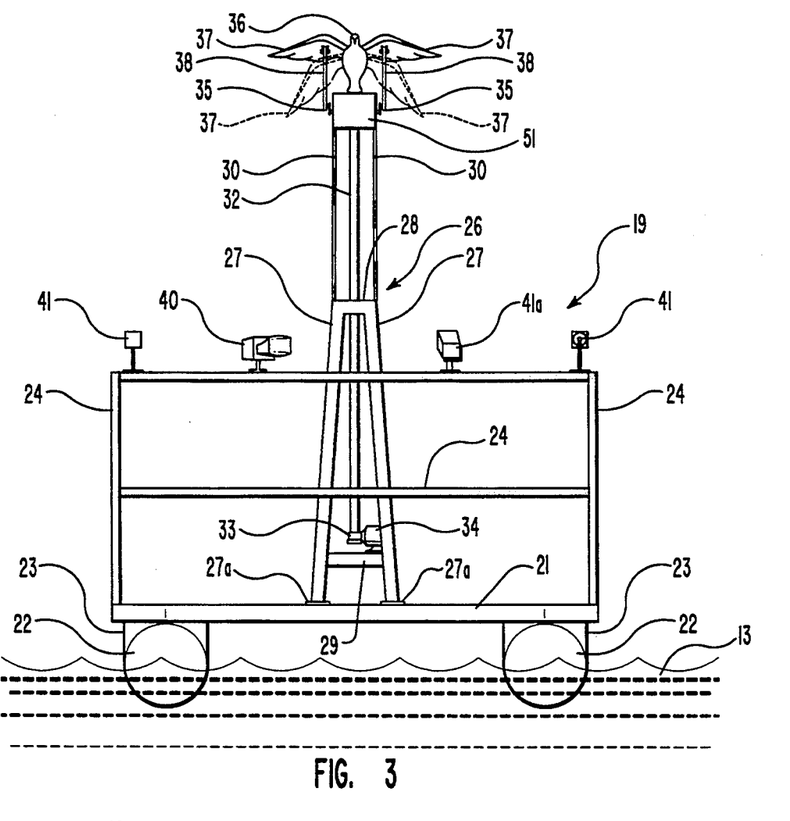
FIG. 3 is a side elevation sectional view taken within the line 3—3 of FIG. 2, showing a floating platform anchored on the pond and mounting a falcon replica whose wings are shown in broken lines as flapping up and down.
Figure 4:
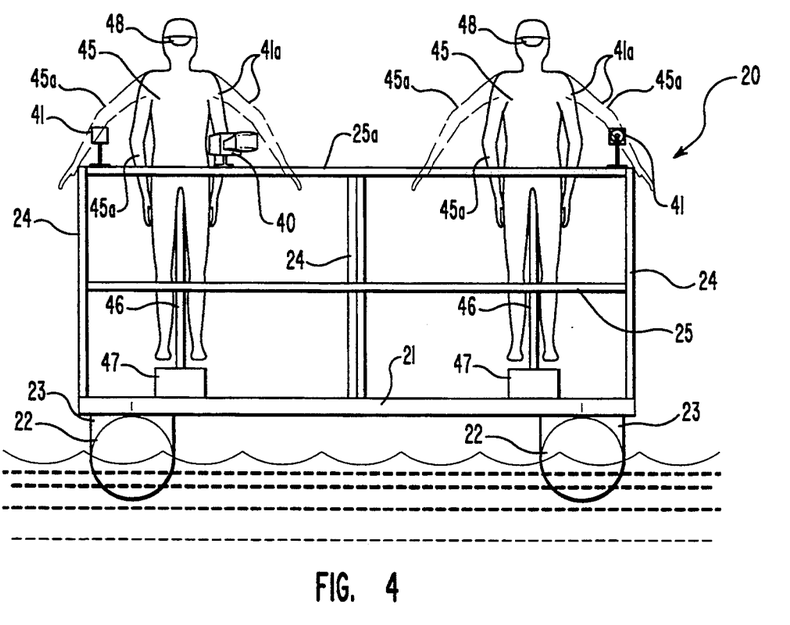
FIG. 4 is a side elevation sectional view taken within the line 4—4 of FIG. 2, showing a floating platform anchored on the pond mounting a pair of mannequins that are arranged to pivot back and forth and showing in broken lines the mannequin arms flailing up and down.

The floating platforms 17, shown in FIG. 1, are also shown in the cross sectional view of FIG. 2, and are individually shown in the sectional views of FIG. 3 and 4. Two arrangements of floating platforms 19 and 20 are shown best in FIGS. 2, 3 and 4. Which floating platforms 19 and 20 are preferably of like construction, with only the displays arranged on each to vary. Therefore, a description of the one platform 19, less the display, should be taken as a description of the other floating platform 20 also. Shown best in FIG. 3, the floating platform 19 includes a flat rectangular base 21 that is supported on barrel type floats 22 that are themselves secured by brackets 23 across the opposite sides of the bottom surface of the flat base 21. A safety fence is preferably provided around the platform top edge that consists of interconnected vertical and horizontal sections 24 and 25, respectively, one of which horizontal sections 25a is a top rail. The sections 24 and 25, as shown, are arranged into fence sections that are vertically mounted to points around the top edge of the flat rectangular base 21. Which fence sections may be fixed or removable, are to provide for safety of an operator performing maintenance on the floating platform displays, as described hereinbelow, and are to provide mounting points for speakers 40 and lights 41 secured thereon.

Shown best in FIG. 3, the floating platform 19 includes, as a display, a tower 26 that is shown as an A frame, and has upright straight legs 27 that are approximately centered on and are secured to the flat rectangular base 21 upper surface, at foot ends 27a with a cap 28 secured across the legs 27 top ends. A horizontal platform 29 is shown maintained between the legs 27, proximate to their foot ends 27 that is essentially parallel to the flat rectangular base 21 upper surface. Supports 30 are shown extending upwardly from the cap 28 to maintain a perch 31 that is shown as a rectangular box and is secured across the support top ends. A drive rod 32 is shown journaled through the cap 28 to slide freely up and down therein and is connected, on its lower end, to an eccentric drive collar 33. The drive collar 33 is connected to be turned by an output shaft that extends from a motor 34 that is maintained on the horizontal platform 29. A top end of the drive rod 32 is journaled into the perch 31 to travel up and down therein. A crank 35 is maintained across interior of the perch 31 to turn therein, with the crank ends shown as journaled in and extending out from the opposite box sides. The crank 35 is turned by the up and down travel of the drive rod 32.

A replica of a falcon 36, that includes wings 37 or other predatory bird, that can be full, double or greater size replica, is shown mounted onto the top of the perch 31. Wings 37 are shown in both solid and broken lines, to illustrate up and down flapping, and are pivotally connected to and extending outwardly from the bird shoulders. Straight connecting rods 38 are shown pivotally coupled to the wings 37, at their mid-points, respectively, with the opposite connecting rod 38 ends journaled onto the crank 35 ends. Turning of the crank 35 thereby moves the connecting rods 38 up and down so as to flap the wings 37 between the attitudes shown in the solid and broken line representations.

The floating platforms 19 can additionally include one of more speakers 40 mounted thereon, as shown, preferably onto the top rail 25a. Additionally, the lights 41, and a light 41a shown in FIG. 3, are also shown secured onto the top rail 25a. The speakers 40 and lights 41 are preferably like and function as do the speakers 15 and lights 16 described hereinabove. The light 41a, however, is included to illuminate the replica falcon 36, and a pair of lights 41a can be so used for illuminating both the replica front and rear, which replica illumination is particularly useful for frightening away landing birds at dawn and dusk and during the night, as needed.

FIG. 4 shows floating platform 20 that, like the floating platform 19, includes a flat rectangular base 21, floats 22 mounted onto brackets 23, with vertical and horizontal sections 24 and 25, forming fence sections, respectively, with a top rail 25a whereon are mounted one or more speakers 40 and lights 41. A pair of mannequins 45 are shown maintained on floating platform 20 as a display or displays for frightening away a landing bird or birds. Each mannequin 45 is shown maintained vertically onto a top end of a straight pole 46, with a bottom end of which pole shown fitted, at a right angle, into a top of a rectangular box 47. The rectangle box 47, it should be understood, houses a motor with a drive extending therefrom as is secured to the pole 46 end to pivot that pole back and forth, functioning like an agitator of a conventional top loading washing machine. In which back and forth pivoting, the mannequin 45, that is connected onto the top end of pole 46, is also pivoted back and forth, in the fashion of a washing machine agitator thereby, the mannequin arms 45a, that are pivotally coupled to the mannequin shoulders, are flailed or pivoted outwardly, as shown in broken line arms 45a. The arms 45a of the pivoting mannequin 45 thereby rapidly rise and fall as the straight pole 46 is pivoted back and forth, for attracting a landing bird's attention frightening it away. Preferably, for further attracting a birds attention during no or low light conditions, each mannequin 45 can be equipped with a visor light 48, that is preferably located in the center of their forehead to shine downwardly therefrom, illuminating the mannequin and its flailing arms.

The floating platforms 19 and 20 are preferably anchored in the pond 13 at set distances from one another and from the shore, and in a likely bird flight-path assumed by an operator from their inspection of the surrounding terrain and structures and study of bird activity in the neighborhood so as to be readily seen by a landing bird. Accordingly, each platform is preferably anchored as by cables, not shown, or the like, in the pond so as to be restrained from moving away from the anchor point and from pivoting, maintaining the displays facing into the likely bird flight-paths. Further, as the invention is in a system for frightening birds away from landing on polluted pond 13, or away from a wet lands area, or the like, it is clear that the floating platforms 19 and 20, with their displays, need to be manufactured from materials as would not be subject to corrosion from prolonged exposed to the contents of the pond 13. Therefore, it should be understood, the floating platforms and displays thereon are preferably manufacture from non-reactive materials, such as a plastic, or the like, within the scope of this invention. For example, the rectangular platform flat base 21 and vertical and horizontal sections 24 and 25 along with brackets 23 can be manufactured from reinforced fiberglass, and the drums are preferably eighty (80) gallon foam filled polyvinyl chloride (PVC) drums. Though, it should be understood, that other non-reactive materials could be so used within the scope of this disclosure.

As set out above, the invention is in an electronic arrangement for generating an electronic net over a polluted pond wet lands area, or the like, to sense a bird that is about to land thereon, and is triggered by that sensing to operate speakers, lights, and displays around and in the pond or covered area to frighten that bird away from landing. Accordingly, the speakers, lights and motors for operating the displays, it should be understood are connected to a source of electrical power and to a an electronically connected automated control arrangement to operate the electronic net. For providing this control function, FIG. 6 sets out a block flow schematic of the programmable logic controller 60, that is shown connected to components of the invention and to other optional components, as discussed hereinbelow. The controller 60, as shown, is preferably linked by telephone lines or radio to a remote data collection and programming computer 64, for separately commanding operation of and for receiving data concerning system operations, and for correlation with other stations and even comparison with weather conditions, or the like, as discussed herein with respect to a discussion of FIG. 6.

Figures 5, 5A:
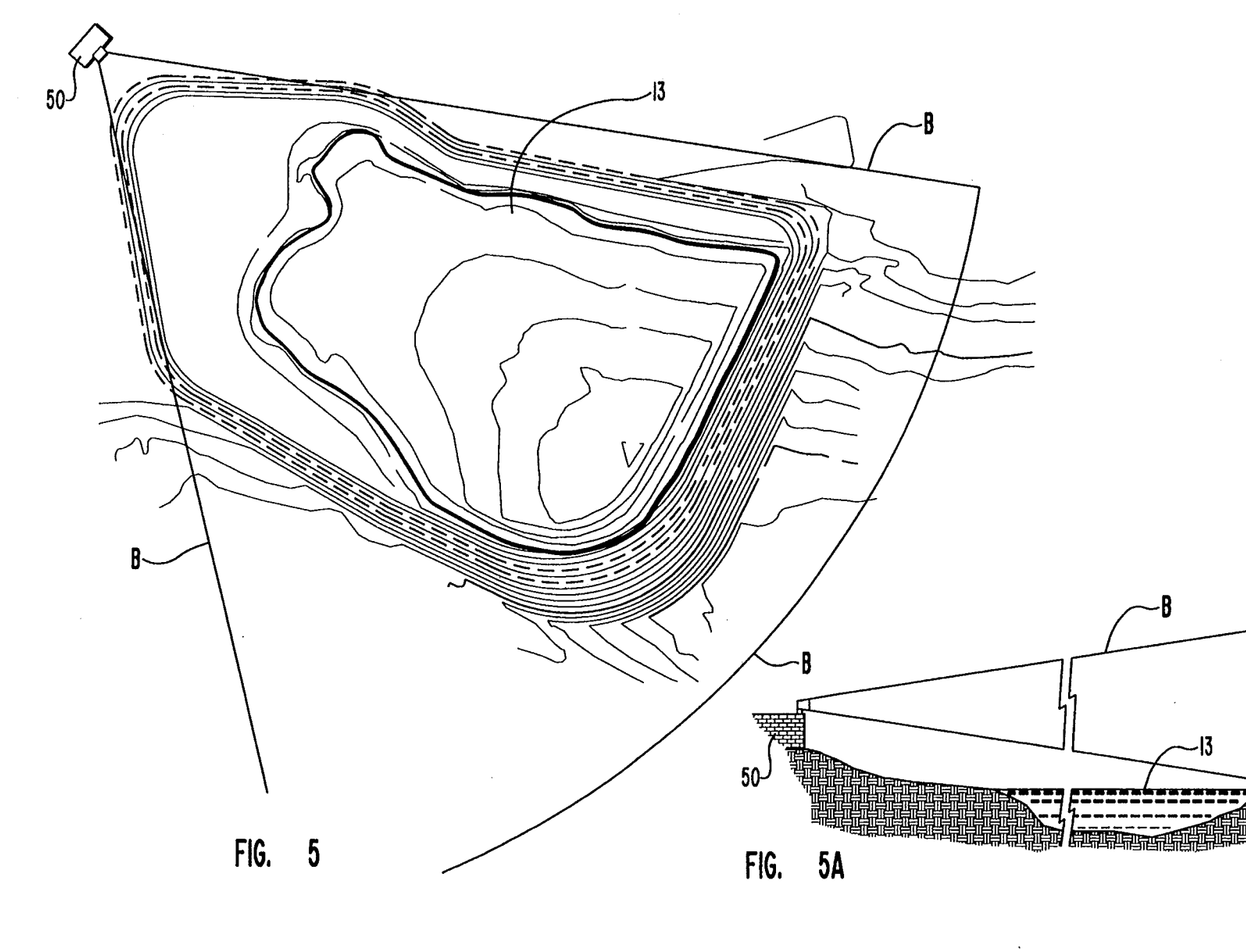
FIG. 5 is top plan topographical view like that of FIG. 1 only showing a radar transmitter-receiver positioned at one end of the pond and showing, in broken lines, a pie shaped signal transmitted therefrom as an electronic net.
FIG. 5A is a side elevation of the radar transmitter-receiver of FIG. 5, showing a vertical representation of the signal transmitted therefrom.

As set out above, the invention involves a generation of an electronic net over a polluted pond, wet lands area, or the like, for controlling operation of speakers, lights, and displays to frighten off a landing bird before it touches down. In FIG. 1, and as discussed above, the first embodiment of the invention involves microwave system 10 for forming the electronic net with transmitters and receivers 11 and 12, respectively. It should, however, be understood that other electronic signal generators could be so used within the scope of this disclosure. For example, FIG. 5, like FIG. 1, shows a top plan topographical view of the polluted pond 13 only shows a single radar 50, that is a transmitter-receiver, as a second embodiment that is maintained at one pond end, and wherefrom an electronic net B, shown as a fan extends over and above the pond and surrounding area. Such transmitter-receiver radar 50 is preferably a conventional unit that is maintained, as shown in FIG. 5A, on a platform 51. In practice a radar manufactured by Furano, known as a radar scanner, can be used for this invention also, it should be understood, other currently available radar units could be so used within the scope of this disclosure.

As illustrated in FIG. 5A, the platform 51 that maintains the radar 50 thereon, is preferably approximately ten (10) to twelve (12) feet above the ground and is located on a bank of the pond 13 that is from zero (0) to twenty (20) feet above the pond surface. Accordingly, the radar 50 is located at one end of which pond to be at a minimum of ten (10) feet above the pond surface. The net B generated from radar 50 is shown in FIG. 5 as having a horizontal arc from the radar that is sufficient to cover the pond, or other area such as a wet lands. Shown FIG. 5A, the net B preferably has a vertical arc of approximately twenty five (25) degrees. The radar signal fan projected from the unit that will sense a bird entering the net and produce a signal return therefrom that will trigger operations of the system alarm devices. A bird entering the top of the net B, as illustrated best in FIG. 5A, will thereby be well above the pond or wet lands, or other surface when it is sensed and triggers operation of the alarm devices. Ample time is thereby provided for the bird to abort its landing prior to its touching down.

Additional to the microwave and radar electronic net generators, set out hereinabove with respect to discussions of FIGS. 1, 5 and 5A, the invention may include additional bird presence monitoring. Specifically, within the scope of this disclosure, the invention may include a positioning of television cameras at appropriate locations around the pond 13, or other area, and even on one or more of the floating platforms 19 and 20. Such visual monitoring is provided to generate a visual sensing of a bird for comparison with the sensing of a bird presence received from operations of the electronic net, or could be independent therefrom.

Figure 1C:
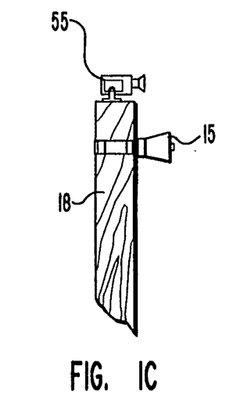
FIG. 1C is an enlarged sectional view of the speaker and pole top end taken within the line 1C—1C of FIG. 1B and showing a video camera mounted above the speaker.

The programmed logic controller 60, illustrated in the block flow schematic of FIG. 6, hereinafter referred to as controller, is provided for generating a signal to turn on the system shore and platform speakers 15 and 40, respectively, shore and platform lights 16 and 41, respectively, and to operate the motors 34 and 47 of the bird 36 and mannequin 45 displays, respectively. The microwave and radar nets 14 and B are for providing a sensing of a bird presence and may be augmented by a visual sensing by a video camera 55 for comparison or coordination with the signal received from a bird breaking the electronic net. A video camera 55 that is appropriate for the invention is one that will proved an input to the controller 60, in the form of pixels. While the video camera 55 or cameras can be located at any chosen location around or even on one of the floating platforms 19 or 20, within the scope of this disclosure, a video camera 55 is shown in FIG. 1C mounted on top of a speaker 15 that is arranged on top of pole 18. Which FIG. 1C is an enlarged sectional view taken within the line 1C—1C of FIG. 1B. Though, of course, a camera 55 or cameras can be otherwise located, within the scope of this disclosure.

The block flow schematic drawing of FIG. 6 shows the components of the invention as controlled by the 60, that is shown connected through modems 61 and 62 to pass information over a telephone line 63 to and from a remote data collection and programming computer 64, hereinafter referred to as computer. While telephone line 63 is shown as connecting the controller 60 and computer 64, it should be understood that such signal transmission could be otherwise provided as by use of radio or microwave transmissions, or other electronic scheme, within the scope of this disclosure.

Systems functioning, as described above, of the speakers 15 and 40, lights 16 and 41, and mechanized bird and mannequin displays 34 and 47, respectively, are shown as operated from the controller 60 through wire linkages. The respective speakers 15 and 40 as set out above, are for playing recordings of high pitched sounds, human sounds, screeching and guns and/or explosives, predatory bird noises, and the like, that are passed from a tone generator 65, digital audio recorder 66 and synthesized sound generator 67 for signal mixing in an audio mixer 68 and passage for amplification to an amplifier 69 that transmits the audio signals to speakers 15 and 40. The lights 16 and 41, that are preferably high intensity and/or strobe lights and are preferably color corrected to primary colors as migratory birds are sensitive to, are illuminated as the speakers 15 and 40 are operated. Additionally, the mannequin illumination lights 48 are also turned on to illuminate the mannequin. The combination of light and sound is, of course, to frighten away a bird setting up for landing on pond 13 or in a wet lands area, or the like, that has passed through the microwave or radar nets 14 or B, respectively.

Additional to the sensing of a bird entry into electronic net 14 or B, as set out above, the invention can provide for visual detection of the bird or birds, utilizing one or more videos of the camera 55, that are shown in FIG. 6 arranged in a broken line box, that can be positioned at locations around the pond 13 and even on the floating platforms 19 and 20. The individual video cameras 55, upon seeing a bird that has entered the electronic net, illustrated as net B that is generated by radar 50, transmits that sighting, as pixels, to a digital video motion detector 70. The detector 70 evaluates the sighting and, upon determining it to be a bird, passes that information to controller 60. Such capability for resolution of a bird in flight can be provided by a number of video cameras 55, as set out above, with that sighting data analyzed in a digital video motion detector for transmission to the controller 60.

As set out above, the controller 60, upon receiving and processing data from the electronic net concerning bird entry into the net, and with a comparison with data from the video cameras 55, commands operation of the display devices to frighten away the bird. Additionally, the system may include a timer 71, shown as a block, for periodically turning the system on so as to scare away any birds who have landed on the pond 13 or any birds or animals that are on or near the pond banks or in or near on area, such as a wet lands area. The controller 60 itself preferably includes a timing function to turn off the system after expiration of a set time period. Also, for testing system operation, a remote maintenance bypass switch 72 is preferably provided for use by maintenance personnel to test the system operations. In such maintenance testing, data stored in the controller 60 can be displayed at a local data display control unit 75 and can be reduced to hard copy at a local report and statistics printer 76, that are shown in FIG. 6 connected to the controller 60, for providing an operator with a record of systems operation.

As set out above, the remote data collection and programming computer 64 is arranged to separately provide for both system control and to receive and record data from the controller 60. To further increase system capability, the controller 60 is preferably connected to receive data concerning pond conditions from sensors positioned in the pond 13. The data concerning pond conditions is both stored and, along with area weather conditions, as discussed below, can be transmitted to the computer 64 for analysis and storage, as desired. To illustrate these data collection capabilities, FIG. 6 further shows blocks identified as contaminated water monitoring equipment (pH, temp, contaminant level, etc.) 73 and weather monitoring equipment (temp, wind, rain, barometric pressure, etc.) 74. The blocks 73 and 74 identify, respectively, sensors for monitoring pond 13 conditions, and a capability for collection of information from a separate weather monitoring station, not shown. Such pond sensors can be located at stations around the pond wet lands, or mounted onto floating platforms 19 and 20, within the scope of this disclosure, and a weather station can be located proximate to the pond or wet lands, within the scope of this disclosure. Which sensor and weather station monitoring provides information that is transmitted to the controller 60 for correlation, as required, storage and printing, as well as for transmission to the computer 64 as data for use in providing a continuous pond wet lands, or the like, status evaluation in conjunction with bird traffic.

The primary object of the invention is to frighten away, and discourage from coming back, migratory and local birds from polluted pond 13. Assuming that a migratory bird that is attempting to land has been flying for a long period of time it may be difficult to discourage it from landing on polluted pond 13. Accordingly, it is important to provide the bird or birds with an alternative clean water pond. Such an alternate pond 80 is shown in FIG. 1A as preferably located adjacent to polluted pond 13. Which alternate clean water pond 80 should be within 50 to 1000 meters from polluted pond 13 to provide a viable alternative pond for landing on by a migratory bird after a long flight.

While preferred embodiments of our invention in a bird avert system have been shown and described herein, it should be understood that the present disclosure is made by way of example only and that variations and changes thereto are possible without departing from the subject matter coming within the scope of the following claims, and a reasonable equivalency thereof, which claims we regard as our invention.

We claim:

1. A bird avert system for discouraging birds from landing on a polluted pond comprising, a means for generating and maintaining an electronic net over the surface of a polluted pond or wet lands area, whereby a bird setting up to land will break said electronic net above said polluted pond or wet lands area to generate an electronic signal for operating alarm devices that include lights, speakers broadcasting sounds and floating platforms anchored in the polluted pond mounting mannequins for frightening a bird away from landing; a programmable logic controller means for controlling system operations to receive and process said electronic signal and pass a signal to operate said alarm devices; and a water condition sensing means that include temperature and pH sensing devices maintained on at least one of the floating platforms immersed in said polluted pond and electrically connected for passing sensed data to the programmable logic controller means.

2. A bird avert system as recited in claim 1, wherein the means for generating and maintaining an electronic net over the surface of the polluted pond or wet lands area are a number of microwave transmitters and receivers positioned to provide signal beams that extend across said polluted pond or wet lands area.

3. A bird avert system as recited in claim 2, wherein the microwave transmitters and receivers are maintained at a height above the polluted pond or wet lands area to provide an electronic net that is a minimum of two (2) feet above said pond surface.

4. A bird avert system as recited in claim 1, wherein the means for generating an electronic net is at least one radar transmitter-receiver that is operated to produce an electronic net that is, at its lowest point, a minimum of twelve (12) feet above the polluted pond or wet lands area.

5. A bird avert system as recited in claim 1, wherein the speakers are a plurality of speakers that are maintained at spaced intervals around and above the surface of the polluted pond or wet lands area to broadcast sounds over said polluted pond or wet lands area appropriate to frighten birds away.

6. A bird avert system as recited in claim 5, wherein at least one speaker of the plurality of speakers is maintained on top of at least one of the one or more posts that are positioned around the polluted pond or wet lands area, and at least one speaker of said plurality of speakers is positioned on at least one of the floating platforms with each said post and platform mounted speaker being approximately five (5) feet above said polluted pond or wet lands area.

7. A bird avert system as recited in claim 1, wherein the lights are a number of high intensity type lights that are positioned at intervals around the polluted pond or wet lands area and on the floating platforms.

8. A bird avert system as recited in claim 1, wherein the lights are strobe type lights positioned at intervals around the polluted pond or wet lands area and on the floating platforms.

9. A bird avert system as recited in claim 1, wherein the floating platforms are each formed of a material that is resistant to corrosion and are anchored below what an operator determines to be a likely bird flight path; and further including on one or more of said floating platforms, one or more representations of predator type bird, each of said predator type bird representations and mannequins being connected to a drive motor arrangement that operates upon receipt of a signal from the programmable logic means to provide outward movement of arms of each said mannequin, and flapping of wings of each said predator type bird representation.

10. A bird avert system as recited in claim 9, wherein each of the plurality of mannequins has at least one light mounted thereon so as to illuminate each said mannequin; and lights are provided on the floating platforms that are directed at so as to illuminate the predator type bird representations.

11. A bird avert system as recited in claim 1, further including one or more video cameras each arranged at a location proximate to the polluted pond or wet lands area, or on one or more of the floating platforms and each said video camera is selected to operate in low light conditions, to transmit a picture to the programmable logic controller means for use in visually identifying a bird penetrating the electronic net.

12. A bird avert system as recited in claim 1, wherein the programmable logic controller means is connected electrically to the means for generating an electronic net and to the alarm devices to pass control signals thereto and record that passage of control signals, and is further connected to a source of electrical power to supply power to said means for generating an electronic net and to the alarm devices.

13. A bird avert system as recited in claim 12, wherein a remote data collection and programming computer means is electrically connected to the programmable logic controller means and is for providing a remote control capability to said programmable logic controller means to operate the bird avert system, which said remote data collection and programming computer means receives and records transmissions from said programmable logic controller means and provides signals to said programmable logic controller means for directing operations of said programmable logic controller means.

14. A bird avert system as recited in claim 1, further including timer means electrically connected to the programmable logic controller means to pass a signal to said programmable logic controller means at the expiration of a set time period causing said programmable logic controller means to transmit a signal to operate the alarm devices.

15. A bird avert system for discouraging birds from landing on a polluted pond comprising, a means for generating and maintaining an electronic net over the surface of a polluted pond or wet lands area, whereby a bird setting up to land will break said electronic net above said polluted pond or wet lands area to generate an electronic signal for operating alarm devices for frightening said bird away from landing; programmable logic controller means for controlling system operations to receive and process said electronic signal and pass a signal to operate said alarm devices; and further including a clean water pond as an alternate safe water pond located within fifty (50) to one thousand (1000) meters of said polluted pond.

16. A bird avert system for discouraging birds from landing on a polluted pond comprising, a means for generating and maintaining an electronic net over the surface of a polluted pond or wet lands area, whereby a bird setting up to land will break said electronic net above said polluted pond or wet lands area to generate an electronic signal for operating alarm devices for frightening said bird away from landing; a programmable logic controller means for controlling system operations to receive and process said electronic signal and pass a signal to operate said alarm devices; and a weather station means located in the area proximate to the polluted pond or wet lands area connected to said programmable logic controller means for passing weather conditions data thereto.

* * * * *